(12) United States Patent
Pinho

(10) Patent No.: US 6,789,931 B2
(45) Date of Patent: Sep. 14, 2004

(54) INTENSE BRIGHTNESS OPTICAL SYSTEM

(75) Inventor: George P. Pinho, Waterloo (CA)

(73) Assignee: Christie Digital Systems Inc., Ontario (CA)

(*) Notice: Subject to any disclaimer, the term of this patent is extended or adjusted under 35 U.S.C. 154(b) by 248 days.

(21) Appl. No.: 10/059,006

(22) Filed: Jan. 30, 2002

(65) Prior Publication Data
US 2003/0142906 A1 Jul. 31, 2003

(51) Int. Cl.[7] .................................................. F21V 7/04
(52) U.S. Cl. .......................................... 362/551; 385/33
(58) Field of Search ............................ 385/33, 34, 35, 385/36, 39, 93; 362/551, 583

(56) References Cited

U.S. PATENT DOCUMENTS 3,720,145 A * 3/1973 Johnson et al. ............. 396/195
5,491,765 A * 2/1996 Matsumoto .................. 385/33

* cited by examiner

Primary Examiner—Frank G. Font
Assistant Examiner—Kevin C Kianni
(74) Attorney, Agent, or Firm—Staas & Halsey LLP

(57) ABSTRACT

An improvement to video projectors having a reflector/lamp for compressing light to a focal point at a predetermined f/#, an integrating rod positioned at the focal point to collect and integrate the light, and a detector for sensing light output from the integrating rod, the improvement comprising a converging lens positioned between the reflector/lamp and the integrating rod for compressing the focal point so as to increase the amount of light entering the integrating rod while consequentially decreasing said f/#, and a diverging lens for increasing the focal point within the integrating rod so as to restore said predetermined f/#. Preferably, the diverging lens is fabricated from gradient index glass.

7 Claims, 1 Drawing Sheet

INTENSE BRIGHTNESS OPTICAL SYSTEM

FIELD OF THE INVENTION

The present invention relates in general to video projection systems, and more particularly to an apparatus for increasing the efficiency of light collection from a lamp into the integrating rod of a video projector.

BACKGROUND OF THE INVENTION

The standard illumination configuration of a D-cinema video projector includes an arc lamp and reflector for reflecting light to a focal point. An SXGA aspect ratio integrating rod is positioned at the focal point to collect and integrate the light. Typically, a 7 KW Xe lamp and reflector are used to focus the light at f/1.5. Research using optical traces has shown that considerable light is lost at the input aperture to the rod when using long arc lamps, due to the large spot size at the focal point (e.g. up to 25.4-mm diameter). The resultant overfilling of the integrator rod reduces the collection efficiency at the exit face (e.g. down to 28%). This, in turn, results in reduced brightness for the projection system.

SUMMARY OF THE INVENTION

The present invention provides a new method and mechanism of light collection that compresses the focal spot produced by the reflector/lamp combination to increase the amount of light entering the integrator rod with no consequential increase in numerical aperture of the optical system. More particularly, a converging lens is introduced between the reflector/lamp and the input aperture of the integrating rod for compressing the focal spot produced by the lamp and thereby increasing the input energy into the integrating rod. As a result of the principle of optical invariance, the decreased magnification from the converging lens also decreases the f/#. Therefore, according to another aspect of the invention the focal spot size is increased in the integrator rod to restore the required f/#.

According to a preferred embodiment of the invention, a diverging lens is attached to the integrating rod for restoring the f/#, although it is contemplated that gradient index glass or other optical mechanisms may be used instead.

The optical arrangement according to the present invention results in greater light collection efficiency than provided by existing projector systems without compromising optical invariance of the system.

BRIEF DESCRIPTION OF THE DRAWINGS

A detailed description of the preferred embodiment is set forth below with reference to the following drawings, in which.

DETAILED DESCRIPTION OF THE PREFERRED EMBODIMENT

Figure 1:
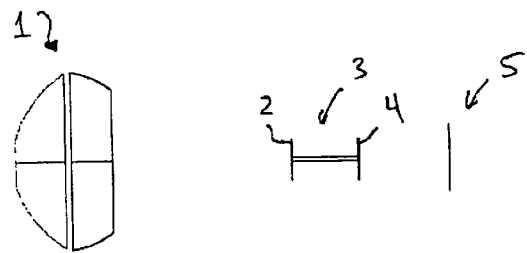
FIG. 1 is a schematic representation of a projector system according to the prior art.

Referring initially to FIG. 1 of the drawings, a projector system is shown according to the prior art comprising a lamp/reflector 1, for directing light to a focal point at which the input aperture 2 of an integrating rod 3 is positioned. The integrated light exits the rod at aperture 4 for sensing via detector 5.

As discussed above, light is lost at the input aperture 2 to the rod 3 due to the large spot size at the focal point, resulting in reduced brightness of the projector system.

Figure 2:
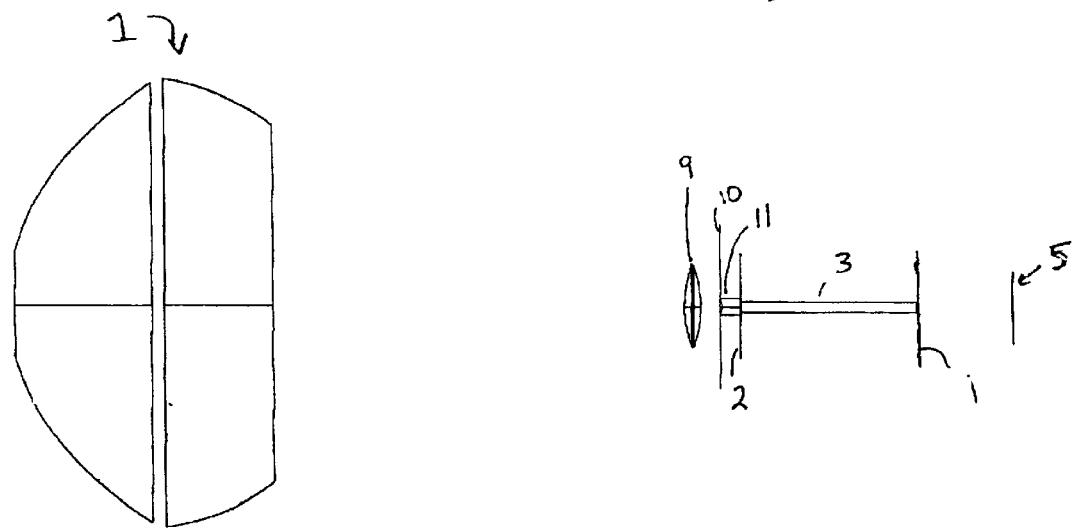
FIG. 2 is a schematic representation of a projector system according to the present invention.

Turning to FIG. 2, the intense brightness optic system is shown according to the present invention comprising, in addition to the standard components of the prior art, a converging lens 9 is provided for compressing the focal spot of light produced by lamp/reflector 1, thereby increasing light energy into the integrating rod 3. By placing the input aperture 2 at the new focal point resulting from lens 9, substantially more light is collected because of the reduced spot size. However, as discussed above, due to the principle of optical invariance (i.e. f/# $\alpha$ magnification), the f/# decreases.

According to a first embodiment of the invention, a diverging lens 11 is affixed to the input aperture 2 for expanding the spot size. This effectively reestablishes the f/# without losing the increased light collection resulting from the lens 9, since the light is constrained within the integrating rod 3 due to total internal reflection (TIR). The lens 11 is preferably affixed to the rod 3 using optical cement via mechanical structure in which case an air space is also created. A further baffle 10 is provided at the input to the diverging lens 11, which acts as an input aperture to eliminate light that is not focused into the diverging lens.

Experimental results have indicated an increase in light throughput using the system of FIG. 2 from 28% to 43.25%, which represents a 53% increase over the prior art.

Preferably, the back surface of input aperture 2 is mirrored to reflect light that is not collected by the rod 3, back through the system for collection on subsequent reflection.

Figure 3:
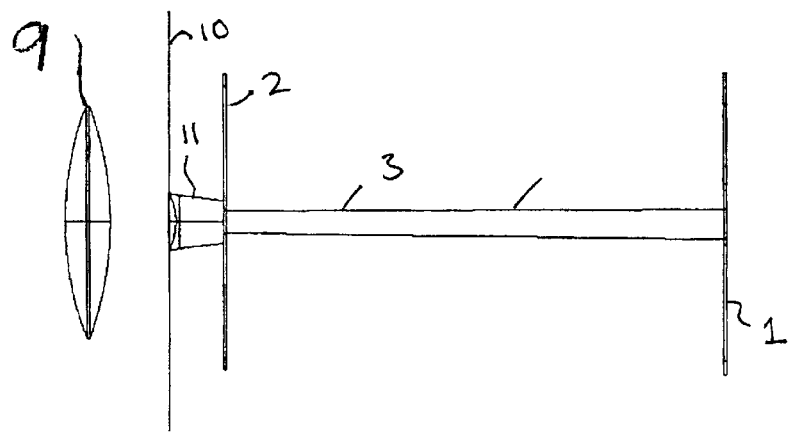
FIG. 3 is a schematic representation of a tapered diverging lens according to an alternative embodiment of the invention.

With reference to FIG. 3, a preferred embodiment of the invention is shown wherein the lens 11 is tapered to increase the amount of light that exits the integrator rod 3 for re-establishing the f/#. According to a further aspect of the invention, the tapered lens 11 is preferably fabricated from gradient glass to provide continuously varying and increasing refractive index as the light propagates therethrough. With the diverging lens 11 fabricated from gradient glass with $\Delta n=0.2$, the light throughput has been measured at 46.5%, which represents a 64% increase over prior art systems.

In a successful prototype of the invention, the converging lens 9 was fabricated from LAK8 glass which exhibits relatively high index of refraction (e.g. n=1.71), resulting in high lens power while maintaining large radii. The diverging lens 11 and rod 3 were fabricated from BK7 and the rod 3 was also tapered slightly (less than 1-mm in x and y directions over 150-mm length), to increase the amount of light emerging at the correct f/#.

The function of the taper on the diverging lens 11 and the rod 3 is as follows. Because of the arc length of the lamp 1, not all light is focused the same way. Upon converging and diverging the light with the extra lenses 9 and 11, some of the light is at a different f/# than is desired. By introducing a taper, the angle of the light is further reduced after every reflection. This helps in directing more light at the correct f/# and produces a 5–10% increase over a non-tapered construction.

In summary, the intense brightness optical system of the present invention results in a video projector with ultra-high brightness. This allows longer lamp life, and smaller projectors with identical performance as large projectors.

A person understanding the present invention may conceive of modifications or variations thereof believed to be within the sphere and scope of the invention as defined by the claims appended hereto.

I claim:

1. For use in a video projector having a reflector/lamp for compressing light to a focal point at a predetermined f/#, an integrating rod positioned at the focal point to collect and integrate the light, the improvement comprising a converging lens positioned between said reflector/lamp and said integrating rod for compressing said focal point so as to increase the amount of light entering the integrating rod while consequentially decreasing said f/#, and a mechanism for increasing said focal point within said integrating rod so as to restore said predetermined f/#.

2. The improvement of claim 1, wherein said mechanism comprises a diverging lens disposed at an input of said integrating rod for spreading said focal point within said integrating rod.

3. The improvement of claim 2, wherein said diverging lens is tapered to increase the amount of light restored to said predetermined f/#.

4. The improvement of claim 2, wherein said diverging lens is fabricated from gradient glass.

5. The improvement of claim 4, wherein said gradient glass is characterised by a gradient of $\Delta n=0.2$.

6. The improvement of claim 1, wherein said integrating rod is tapered to increase amount of light restored to said predetermined f/#.

7. The improvement of claim 3, wherein said diverging lens is fabricated from gradient glass.

* * * * *